Figure 1:
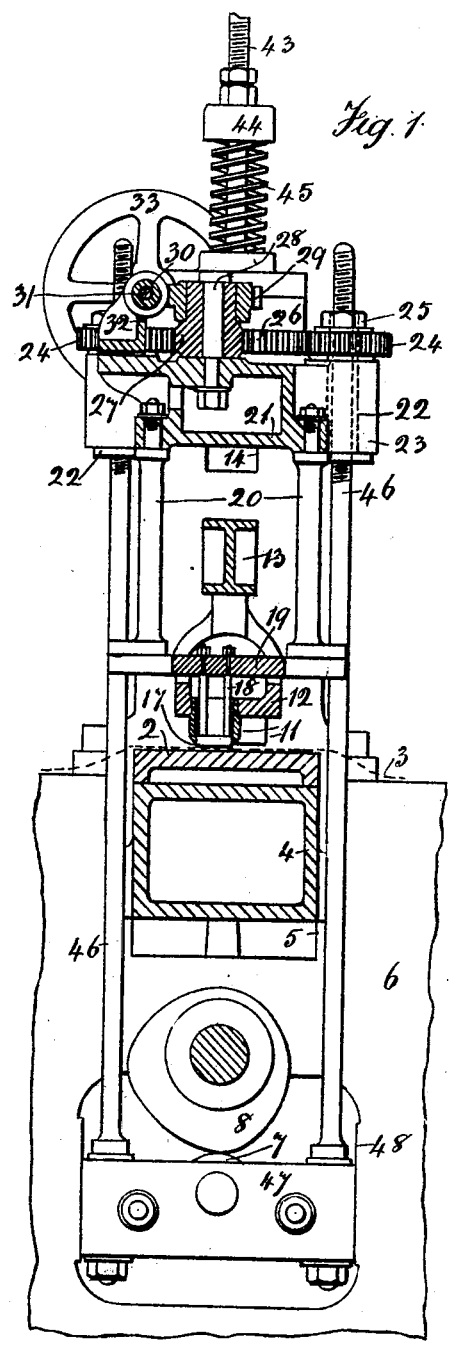

No. 814,486. PATENTED MAR. 6, 1906.
T. VICARS & J. VICARS, THE YOUNGER.
BISCUIT STAMPING AND CUTTING MACHINE.
APPLICATION FILED NOV. 23, 1903.

2 SHEETS—SHEET 1.

Witnesses
M. B. Johnson
H. Lightfoot

Inventors
Thomas Vicars
John Vicars the Younger

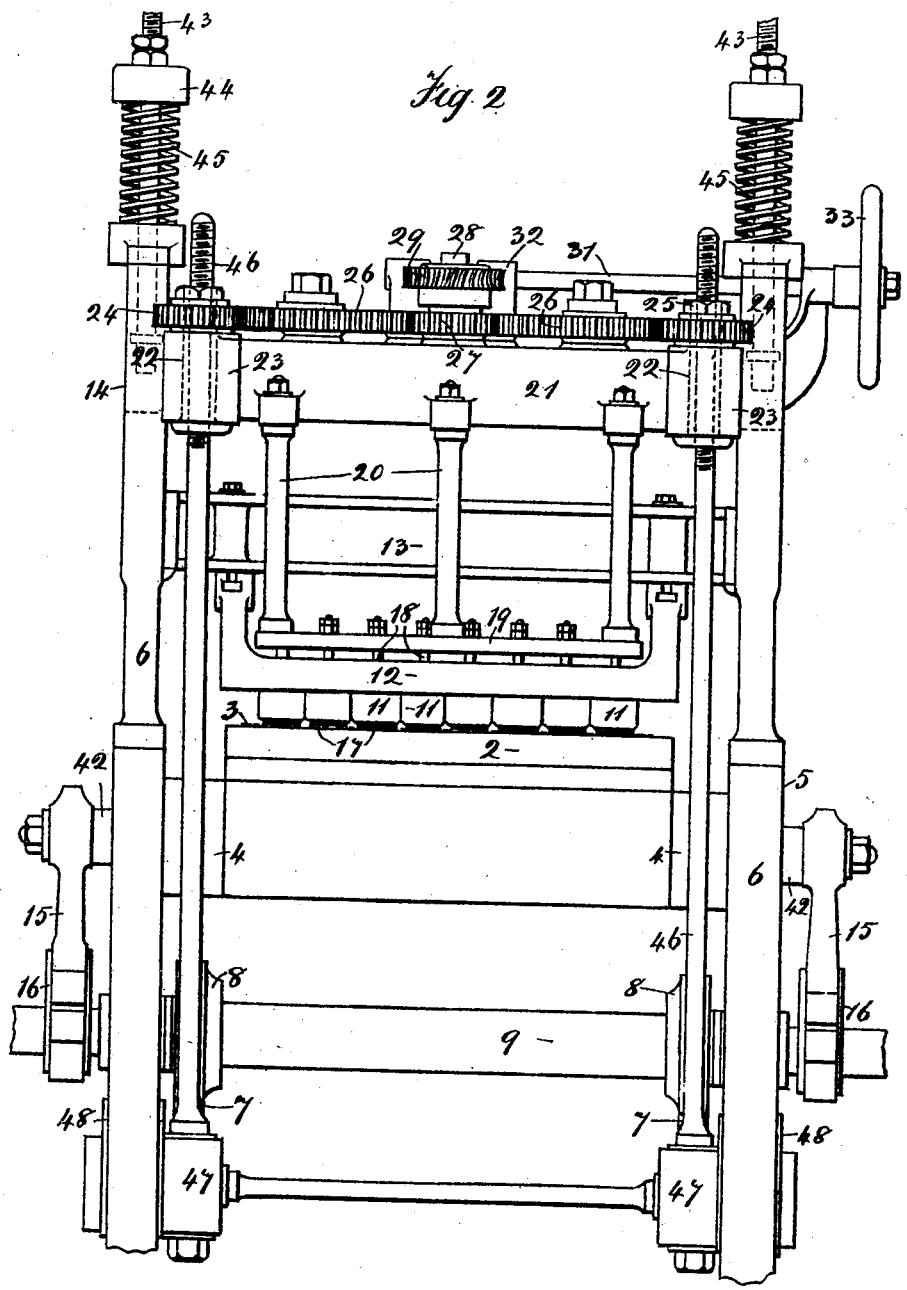

UNITED STATES PATENT OFFICE.

THOMAS VICARS AND JOHN VICARS, THE YOUNGER, OF EARLESTOWN, ENGLAND.

BISCUIT STAMPING AND CUTTING MACHINE.

No. 814,486.  Specification of Letters Patent.  Patented March 6, 1906.

Application filed November 23, 1903. Serial No. 182,346.

*To all whom it may concern:*

Be it known that we, THOMAS VICARS and JOHN VICARS, the Younger, subjects of the King of Great Britain, residing at Earlestown, in the county of Lancaster, England, have invented new and useful Improvements in Biscuit Stamping and Cutting Machines, of which the following is a specification.

The invention relates to machines in which hollow cutters surrounding the stamps, embossers, or impressors act first to detach or strip off the stamped sheet of dough from the stamps and then complete the cutting out of the biscuits from the sheet; and our invention consists in new constructions, arrangements, and operations of mechanism to effect these purposes and to regulate the mechanism according to the thickness of the sheet of dough from which the biscuits are being cut.

Our invention is carried out by mechanism such as is illustrated on the drawings, whereon—

Figure 1 is a central longitudinal section, and Fig. 2 an end view, of a portion of a biscuit-cutting machine embodying our invention.

The drawings only show the cutting and stamping parts of the machine, the remaining parts for traversing the sheet of dough, removing the biscuits, and other operations connected with the manufacture not being shown, as they are of any usual kind.

In carrying out our invention as regards the stamping and cutting we arrange the cutting-table to reciprocate in guides or otherwise toward the cutters and stamps, while the cutters are adjustably or rigidly fixed to the framework of the machine and the stamps caused to reciprocate either adjustably or not.

Referring to the drawings, 2 is the cutting-table, over which a sheet of dough 3 is caused to travel intermittently in the usual way.

4 represents brackets or a bearer supporting the table.

5 represents guides in or on the framework 6, in which the brackets 4 can move up and down. The ends of the brackets 4 are provided with pins or gudgeons 42, connected by rods 15 to eccentrics 16 on the operating-shaft 9, so that the table is reciprocated by the eccentrics.

11 represents the cutters fixed to the cutter-bar 12, secured to a cross-head 13, which is rigidly fixed to the framework 6.

17 represents the stamps or impressors for stamping the design on the biscuits, secured by rods 18 to a plate 19, which is in turn connected by rods 20 to a cross-head 21, which is free to slide in guides 14 in the frame 6.

43 represents rods secured to the cross-head 21 and provided with collars 44, against which press springs 45, so that the cross-head and stamps always tend to be lifted up.

46 represents rods screwed at their upper ends and engaging with internally-screwed sleeves 22, which are rotatable in bosses or bearings 23 on the cross-head 21.

24 represents toothed wheels secured to the sleeves 22 by nuts 25 or otherwise, as convenient. The wheels 24 gear into idle wheels 26, which in turn gear with a toothed pinion 27, mounted on a pin 28 on the cross-head.

29 is a worm-wheel secured to the pinion 27 and operated by a worm 30 on a shaft 31, rotatable in bearings 32 by a hand-wheel 33. Thus by rotating the hand-wheel 33 the sleeves 22 are rotated, and the rods 20, plate 19, rods 18, and stamps 17 are moved up or down, so that the stamps are adjusted to any desired distance from the table 2.

Stripping-plates for stripping the dough from the outside of the cutters may be used; but these may be of any usual kind and for clearness are not shown.

The lower ends of the rods 46 are attached to heads 47, movable in guides 48 and carrying rollers 7, which bear against cams 8, so that such cams can draw down the stamps 17 against the compression of the springs 45.

Instead of springs 45 being used to raise the stamps cam mechanism might be used for that purpose, and also instead of using eccentrics 16 for raising the table cam mechanism might be advantageously used.

The action of the above arrangement is as follows: The table raises the sheet of dough and at the same time the stamps descend and meet the dough just below the cutter edges and impress the design on the sheet. The stamps then rise quickly above the cutter edges, and if the dough adheres to the stamps the cutter edges strip it off and it falls upon the still rising table, which carries it upward against the cutter edges, which cut out the biscuits. The table then descends, and the stamps make a small downward movement to eject the biscuits from the cutters. When the table reaches its lowest position, the sheet of dough is advanced, the table again rises, and the operation is repeated. Instead of the regulating-sleeves 22 and their gearing being applied to the rods 46 they may, as will be obvious, be applied to the rods 20.

Our invention is not confined to the exact details of construction above described, as it will be obvious that many different equivalent arrangements of mechanism may be made to effect the desired motions of the cutting-table and stamps and that other equivalent arrangements of regulating mechanism may be used at any convenient point in the connections between the operating-shaft and the stamps or table without departing from the nature of our invention.

We do not claim, broadly, the method of first stamping and afterward cutting out biscuits; but What we do claim, and desire to secure by Letters Patent, is—

1. In biscuit stamping and cutting machines, the combination of a reciprocating cutting-table, fixed cutters reciprocating stamps disposed within the cutters, mechanism for operating the table, and mechanism for pressing the stamps on the dough before cutting commences and withdrawing the stamps before the cutting out is finished; substantially as described.

2. In biscuit stamping and cutting machines, the combination of a reciprocating cutting-table, fixed cutters, reciprocating stamps disposed within the cutters, mechanism for operating the table, and mechanism for pressing the stamps on the dough before cutting commences and withdrawing the stamps before the cutting out is finished, regulating devices on the connections between the stamps and their operating mechanism, and mechanism for operating all the regulating devices simultaneously to regulate the position of the stamps relative to the surface of the cutting-table; substantially as described.

In testimony whereof we have signed our names to this specification in the presence of two subscribing witnesses.

THOMAS VICARS.
JOHN VICARS, THE YOUNGER.

Witnesses:
W. B. JOHNSON,
H. LIGHTFOOT.